United States Patent [19]
Charpak

[11] Patent Number: 5,347,131
[45] Date of Patent: Sep. 13, 1994

[54] GAS IONIZING-RADIATION DETECTOR

[76] Inventor: Georges Charpak, 37 Rue de la Plaine, 75020 Paris, France

[21] Appl. No.: 50,096
[22] PCT Filed: Jul. 29, 1992
[86] PCT No.: PCT/FR92/00743
 § 371 Date: May 12, 1993
 § 102(e) Date: May 12, 1993

[30] Foreign Application Priority Data
Jul. 29, 1991 [FR] France ............... 91 09604

[51] Int. Cl.$^5$ ............................... H01J 47/02
[52] U.S. Cl. ............................... 250/385.1
[58] Field of Search ............................... 250/385.1

[56] References Cited

U.S. PATENT DOCUMENTS 5,025,162  6/1991  Charpak ............... 250/385.2
5,138,168  8/1992  Jeavons ............... 250/385.1

FOREIGN PATENT DOCUMENTS 0395510  10/1990  European Pat. Off. .
9000747   1/1990  PCT Int'l Appl. .
563084   12/1978  U.S.S.R. ............... 250/385.1

OTHER PUBLICATIONS

*Nuclear Instruments & Methods in Physics Research*, vol. 216, No. 3, Nov. 1983 Amsterdam NL, pp. 393–397, De Palma, et al., "System of large multiwire proportional chambers . . . ".

William Frieze, Satish Dhawan, Adrian A. Disco, Lincoln Fajardo, Richard Majka, Jay N. Marx, Peter Némethy, Jack Sandweiss and Anna J. Slaughter, "A High Resolution Multiwire Proportional Chamber System." *Nuclear Instruments and Methods*, vol. 136, No. 1 (Jul. 1, 1976) pp. 93–97 ©North–Holland Publishing Co.

J. M. Breare, K. A. Short, G. C. Smith and R. A. Cunningham, "A Sense Wire Support for Large Multiwire Proportional Chambers." Conference: *1973 International Conference on Instrumentation for High Energy Physics*, Frascati, Italy (May 8–12, 1973) pp. 296–297.

*Primary Examiner*—Constantine Hannaher
*Attorney, Agent, or Firm*—Larson and Taylor

[57] ABSTRACT

A gas detector for ionizing radiation particularly of the β type leading to the emission of energetic electrons by a surface adapted to provide for mono-dimensional or two-dimensional detection. The gas detector includes a sealed enclosure containing an ionizing electron generating gas and at least two grids at different electric potentials, one of them constituting the anode. One of the grids at least is formed in a first direction by a plurality of electrically insulating wires serving as a support and in a second direction, distinct from the first, by a plurality of electrically conductive and resistive wires which form a woven mesh.

13 Claims, 6 Drawing Sheets

GAS IONIZING-RADIATION DETECTOR

The invention relates to a gas detector for ionizing radiation, such as β-radiation.

The detection of ionizing radiation, such as β-radiation emerging from surfaces of the body subjected to analysis, is currently produced by electron-avalanche multiplication in gases. Some detectors employ so-called multiwire chambers in which the amplification of the ionization electrons, generated by the ionizing radiation in the gaseous medium, is produced by virtue of an avalanche around a thin anode wire.

Other detectors use the amplification in the spaces between two parallel electrodes, consisting of metal wires, each forming an unmeshed network, and allow location of the avalanche produced by the multiplication of the ionization electrodes, or alternatively by optical methods by employing the light emitted by the avalanches. Such detectors function satisfactorily.

It will be noted, however, that the employment of this type of detector involves difficulties, inasmuch as the wires are successively assembled on a frame. The spacing between wires cannot at best be less than one millimeter, which consequently has the effect of limiting the spatial resolution of location of the avalanche front.

The object of the present invention is to overcome the aforementioned drawback.

Another object of the present invention is the implementation of a gas detector for ionizing radiation, of the β-radiation type, making it possible to obtain a spatial resolution of detection of the avalanche front better than one hundred microns.

A further object of the present invention is the implementation of a gas ionizing-radiation detector in which, in the case of electrical discharge in the avalanche space, the electric current due to this discharge is very highly limited, which protects the electrodes or grids from corresponding damage.

A further object of the present invention is the implementation of a gas ionizing-radiation detector in which the mechanical deformations of the electrodes under the effect of the electrostatic forces applied to the latter, by virtue of their electrical polarization, are eliminated, without introducing any bracing or mechanical spacer into the avalanche space, in order to keep the inter-electrode distance constant.

The gas ionizing-radiation detector which forms the subject of the present invention comprises, in a sealed enclosure, a gas generating ionization electrons by the avalanche phenomenon, and at least two grids held at different electrical potentials and making it possible to accelerate the ionization electrons.

It is noteworthy in that at least one of the grids is formed in a first direction by a plurality of electrically insulating wires, acting as a support, and, in a second direction, distinct from the first, by a plurality of electrically conducting wires. These wires, directed respectively in the first and second directions, form a woven mesh.

The gas ionizing-radiation detector which forms the subject of the present invention is particularly well suited to detecting β-rays, in particular high-intensity β-radiation for which high counting rates are necessary.

The gas ionizing-radiation detector according to the invention will be described in more detail in the following description with reference to the drawings, in which:

FIG. 5b represents an embodiment detail of the detection system as represented in FIG. 5a;

FIG. 6b represents a view in section along line 6b-6b of FIG. 6a;

A more detailed description of the gas ionizing-radiation detector which forms the subject of the present invention will first be given with reference to FIG. 1a)-1c).

In the aforementioned Figure, a gas ionizing-radiation detector in accordance with the subject of the present invention has been represented, this type of detector being more especially well suited to the detection of β-type radiation, and in particular of high-intensity radiation of this type.

As can be seen in the aforementioned Figures, the detector comprises at least two grids, denoted G1, G2, held at different electrical potentials, and making it possible to accelerate the ionization electrons created by an avalanche phenomenon, denoted Av. The detector consists of a sealed enclosure 1, formed for example by a box, comprising an input face, denoted 11, formed for example by a sheet of plastic, this same box being closed at its other end by a plate, 12, of plastic, or possibly of a metal, the whole thing being filled with a gas which is capable, under the effect of $\beta$-radiation, of generating ionization electrons. The gas may for example consist of a mixture of argon and methane with approximately 10% by volume of methane. As is conventional, the enclosure thus constituted by the box 1 may be supplied with the aforementioned gas in a slight overpressure so as to guard against leaks. The gas supply system of the sealed enclosure thus produced will not be described, because it corresponds to devices which are known to the person skilled in the art. The object to be analyzed, formed for example of a sectioned preparation 10, is placed in the vicinity of the input window 11.

It will be noted that the grids G1 and G2 are held at different electrical potentials in order to generate an electric field, denoted E, making it possible to accelerate the ionization electrons.

Furthermore, as has been represented in FIG. 1b, one grid or both grids G1, G2 are formed in a first direction by a plurality of electrically insulating wires, denoted 101, acting as a support, and in a second direction, distinct from the first, by a plurality of electrically conducting wires 102. It will be noted that, in a particularly advantageous manner, the wires directed respectively in the first and second directions form a woven mesh, as represented in FIG. 1c). The electrically insulating wires 101 being represented in broken lines, and thus fulfilling the function of a mechanical support for the electrically conducting wires 102.

It will thus be noted that, in a particularly advantageous fashion, the grids G1 and G2 may be produced no longer, as in gas detectors of the prior art, by means of wires assembled successively one after another on a frame, but, conversely, by means of the aforementioned woven mesh.

Figure 1A:
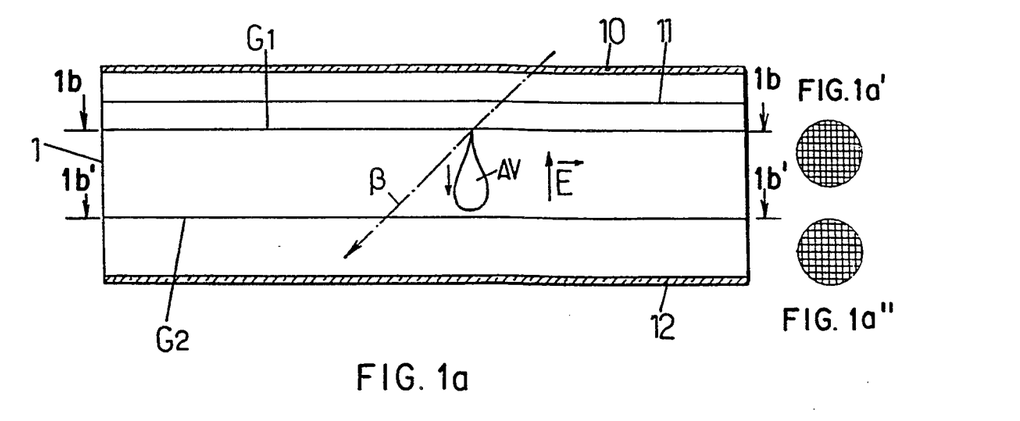
FIG. 1a) the substructure of a gas ionizing-radiation detector which forms the subject of the present invention, in a viewing direction orthogonal to the direction of propagation of the avalanche Av, while FIGS. 1a' and 1a'' show respective portions of grids G1 and G2 viewed in the direction of propagation.
Figure 1B:
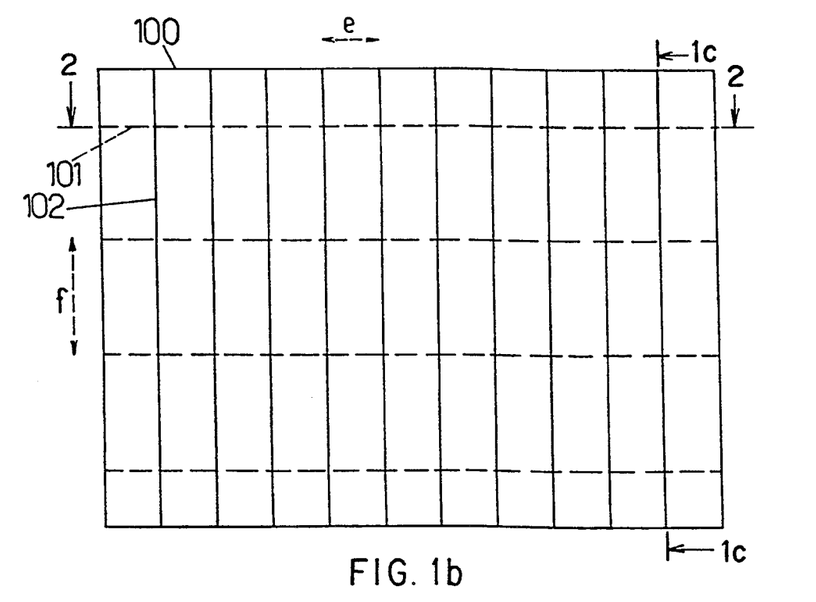
FIG. 1b) shows a view in section along the cutting planes 1b-1b or 1b'-1b' of FIG. 1a)
Figure 1C:
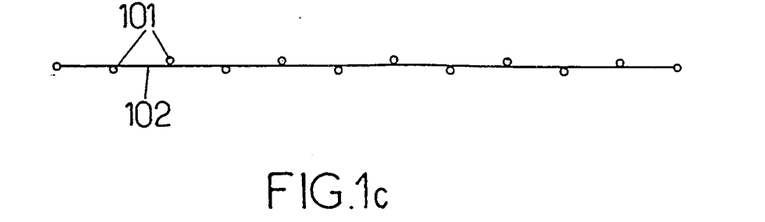
FIG. 1c) shows a view in section along the cutting plane 1c-1c of FIG. 1b)
Figure 2:
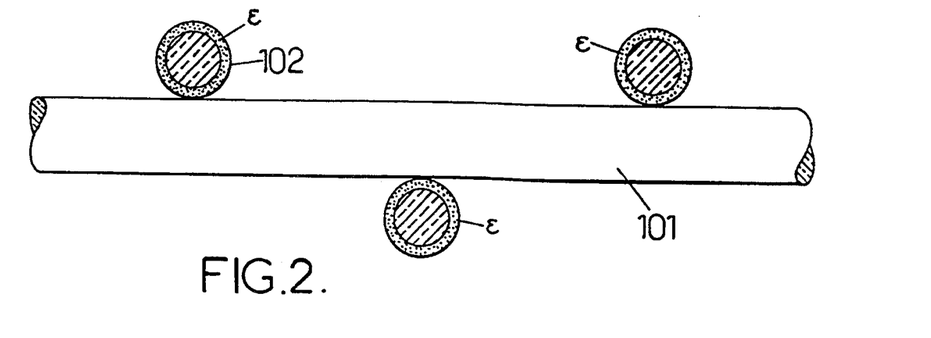
FIG. 2 shows a view in section along the cutting plane 2-2 in FIG. 1b)

In general, it will be considered that the second grid G2 forms an anode for the ionization electrodes with respect to the first grid G1, as is represented by the direction of the electric field E in FIG. 1a of the latter.

According to a particularly advantageous embodiment of the detector which forms the subject of the present invention, the electrically conducting wires 102 are formed by a plastic wire whose outer lateral surface is provided with an electrically conducting layer, denoted $\epsilon$, having an electrical resistance per unit length $\rho$ lying between $200 k\Omega/cm < \rho < 600 k\Omega/cm$.

It will be noted that in an advantageous embodiment, the electrically conducting layer is formed by a thin film of carbon. Furthermore, depending on the applications, it is possible to adjust the value of the resistance per unit length beyond the values indicated, by electrolytically depositing copper then gold on the wires having a carbon surface.

In order to produce, in a particularly advantageous manner, a detector in accordance with the subject of the present invention, use may be made of woven meshes in the form of gauze produced by the company SCHWEIZERISCHE SEIDENGAZE FABRIK AG THAL CH-9425 THAL/SG (SWITZERLAND).

It will particularly be noted that the woven fabrics or gauze marketed by the aforementioned company consist in one direction of a plastic wire, which, following a specific chemical treatment, has its surface broken down to give a thin film of carbon $\epsilon$ whose thickness is less than 1 micron. In the other direction, preferably a perpendicular direction, the wire of electrically insulating material makes it possible to produce the aforementioned woven mesh. Thus, the aforementioned company markets woven meshes or gauze whose mesh is, for example, square or rectangular, of pitch e, f, as is represented in FIG. 1b), it being possible for the pitch values to lie between 50 and 500 microns. It will thus be noted that the wires constituting at least one grids G1, G2 of the detector which forms the subject of the present invention, are parallel, rectilinear and spaced by a distance of between 50 and 500 microns. It will finally be understood that the woven fabrics or gauze used may be formed by electrically conducting wires in both perpendicular directions, the high values of electrical resistance per unit length of such wires allowing the use of such woven fabrics or gauze without drawbacks.

According to a particularly advantageous feature of the detector which forms the subject of the present invention, the resistance of the conducting wires 102 is sufficiently high for, in the case of discharge in the space of the two electrodes G1, G2, that is to say the space generating the avalanche phenomenon, such a discharge phenomenon giving rise to a spark, the latter not to be able to develop high energy because of the electrical resistance of the wires, which then makes it possible to limit the corresponding electric current. Such a characteristic thus makes it possible to protect the electrically conducting wire and the neighboring wires, and, finally, the grid itself, against breakage due to a spark generated under the aforementioned conditions.

It will be noted that, in general, taking into account the woven meshes or gauze used, the grids employed in the detector which forms the subject of the present invention make it possible to have conducting wires of 20 to 30 micron diameter, which are very close together, for example at a distance of 100 microns, which is normally very difficult to obtain in accordance with an implementation according to the prior art.

It will further be noted that spatial resolution of the aforementioned grids G1, G2, that is to say the precision of the location of the avalanche front when employing electronic detection, depends on the distance between the conducting wires, which makes it possible to achieve a spatial resolution corresponding to the distance separating two conducting wires 102, namely a spatial resolution which can be made less than 100 microns depending on the woven mesh or gauze used.

It will be noted that, in devices of the prior art, it is barely possible to achieve a spatial resolution with a value better than approximately 1 millimeter by digital methods identifying the wire which is the seat of the avalanche.

It will be noted that the spatial resolution of the gas ionizing-radiation detector which forms the subject of the present invention, is normally obtained for perfectly flat electrodes, that is to say grids on which the gauze or woven mesh is perfectly stretched over a support frame 100 as represented in FIG. 1b).

However, and in particular in the case of the production of large detectors, it will be noted that, in particular in the case where the grids consist, in a non-limiting manner, of rectangular grids, these latter may be subjected to deformations because of the electrostatic forces generated by the electric fields necessary for creating the avalanche phenomenon.

Figure 3A:
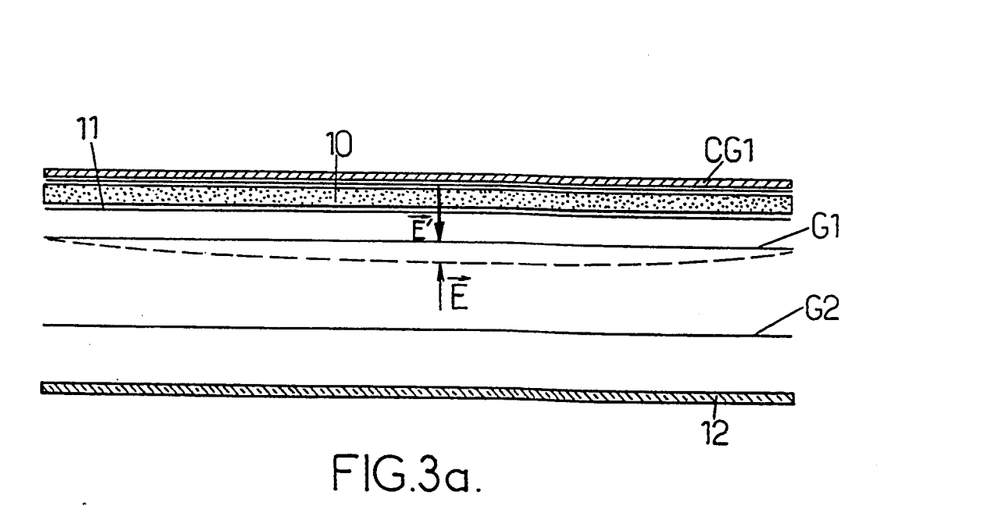
FIG. 3a shows a first variant embodiment of the detector according to the invention represented in FIG. 1a), in which the deformations of the electrodes or grids delimiting the avalanche-amplification space of the ionization electrodes are eliminated.

As has been represented in FIG. 3a, for example, under the effect of the aforementioned electric field E, the grid G1 is, for example, subjected to an electrostatic force, and to a maximum deformation as represented in broken lines, at the center of the aforementioned grid. The effect of such a deformation is to change the avalanche gain because of the modification of the actual space between the grids G1 and G2 delimiting the avalanche space.

The result is a gain which varies with the position or row of the corresponding electrically conducting wire. As a solution, it has so far been possible to propose placing the spacer bracings or supports at regular intervals between the grids in order to keep their distance substantially constant. Such a solution leads to dead zones around the aforementioned braces, it being possible for these dead zones to be detrimental in certain applications.

In order to overcome the aforementioned drawback, the grids of the detector which forms the subject of the present invention, because their construction from a woven mesh or gauze is relatively sensitive to the deformation phenomenon as described in connection with FIG. 3a, it is particularly advantageous, as is represented in this same Figure, to provide outside the space lying between the grids G1, G2, that is to say outside the avalanche space, at least one backing grid, denoted CG1, making it possible to apply to the grid G1 for example an electrostatic force for compensating for the electrostatic force generated between the grids G1, G2. This makes it possible to eliminate the deformations of the grid G1, G2, keeping their spacing constant. As has been represented in FIG. 3a for example, by way of non-limiting example, the backing grid CG1 may be placed in the vicinity of the input window of the detector consisting of the plastic sheet 11, the sample 10 to be analyzed then being inserted between the backing grid CG1 and the aforementioned input window. It will of course be noted that the sample to be analyzed may consist of a preparation in the form of a thin section of sample, denoted 10. The backing electrode CG1 may be produced using a sheet of plastic, one face of which has been metalized, the metalized face being held, with respect to the first electrode G1, at a potential making it possible to generate an electric field E' of direction opposite to the electric field E. The amplitude of the electric field E' may be determined experimentally as a function of the dielectric characteristics of the space separating the input window 11 from the grid G1, of the sheet of plastic constituting the aforementioned input window 11, and, when the object 10 to be analyzed is placed, as represented in FIG. 3a, between the backing electrode CG1 and the input window 11, of the dielectric characteristics of this object.

Figure 3B:
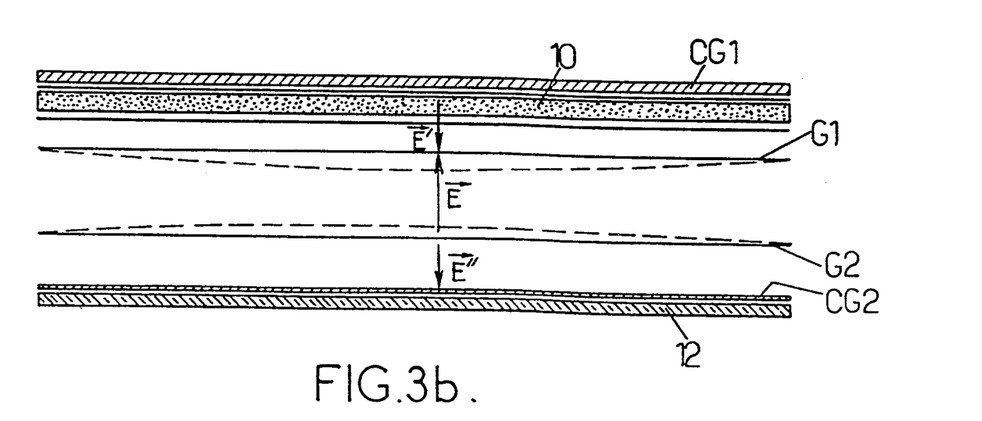
FIG. 3b shows a second variant embodiment of the detector according to the invention represented in FIG. 1a), in which the deformations of the electrodes or grids delimiting the avalanche-amplification space of the ionization electrodes are eliminated.

FIG. 3b shows, in the same manner, a detector in accordance with the subject of the present invention, provided, on the one hand, with a backing electrode CG1 identical to the one represented in FIG. 3a, and, on the other hand, with a second backing electrode CG2. The second backing electrode CG2 may advantageously be produced by a metalization formed on the plate 12 closing the box 1, when the plate 12 is constructed from plastic, for example. The backing electrode CG2 then makes it possible to generate an electric field E'' opposite to the electric field E necessary for creating the avalanche phenomenon, in order to return the second electrode G2 to its initial position, and thus to eliminate any deformation of the latter due to the amplification of electrostatic forces. It will of course be noted that in the case of the presence of two backing electrodes CG1, CG2, it will be advantageous to balance the compensating electric fields E', E'' created, by a suitable adjustment of the potentials applied to the aforementioned backing electrodes.

Figure 4:
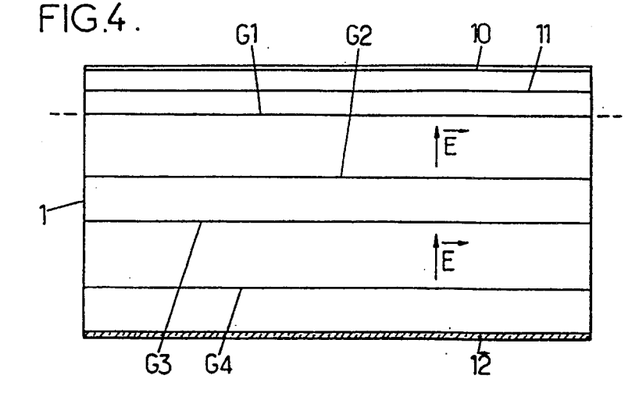
FIG. 4 shows a non-limiting variant embodiment of FIG. 1a), in which two successive avalanche-amplification spaces are provided.

In general, it will be noted that the number of electrodes or of pairs of electrodes G1, G2 forming the avalanche space is not limited to one, it being possible for a multistage construction to be produced as represented in FIG. 4. In the aforementioned Figure, the presence of the electrodes G1, G2, on the one hand, and successively in cascade, of a drift space, then of electrodes G3, G4 forming a second avalanche space, will be noted. In such a case, the gain between the electrodes G1, G2 may for example be taken to be equal to 1000, it being possible for the gain between the electrodes G3 and G4 to be fixed at the same value, for example. It will be noted that such a structure makes it possible to reduce breakdowns, and obviously makes it possible to obtain a higher overall avalanche gain.

Furthermore, other embodiments may be envisaged. By way of example, indication will be given that it is possible to produce a proportional gain between G1 and G2, for example the aforementioned value 1000, then a space promoting the creation of sparks with a view to optical detection, for example, between the grids G3 and G4. Such a construction reduces, in accordance with the device of the prior art, the rates of sparking generated by grids of the metal type, this rate furthermore being substantially eliminated, because of the use of grids comprising resistive electrically conducting wires in accordance with the subject of the present invention.

It will furthermore be noted that, by virtue of the use of the negative polarization feedback technique, as described in the French Patent Application previously filed in the name of Georges CHARPAK on 27 Apr. 1989 under No. 89 05605 and published on 2 Nov. 1990 under U.S. Pat. No. 2,646,519, remarkably stable operation is in fact obtained, the choice of a gaseous mixture, such that a small discharge or spark visible to the naked eye, during the detection of $\beta$-radiation, may then be made.

Figure 5A:
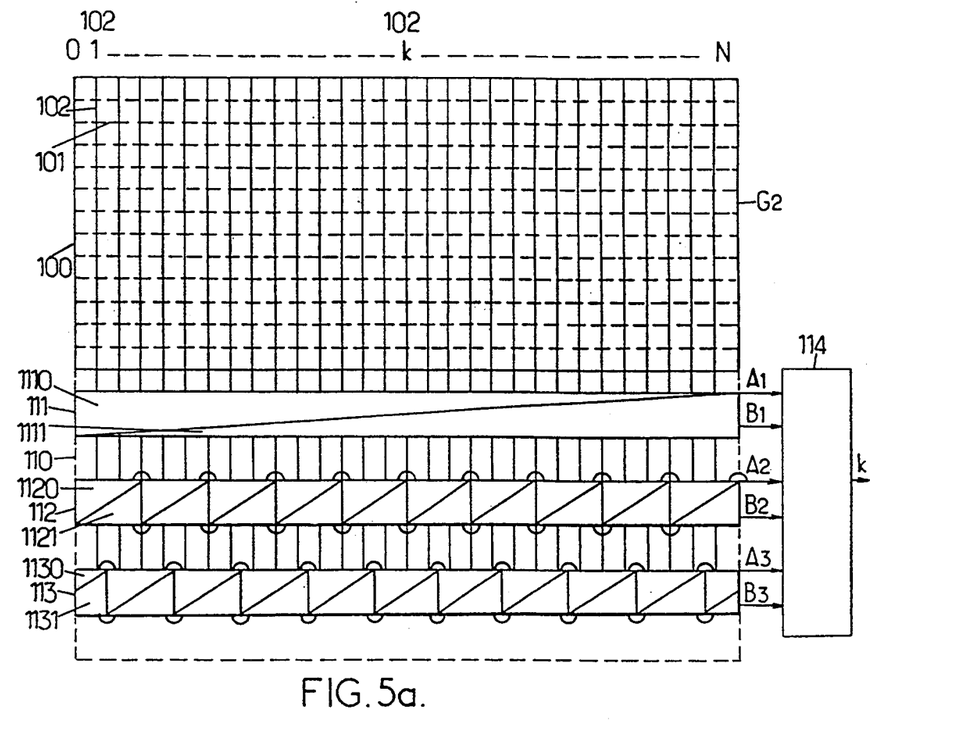
FIG. 5a represents an advantageous embodiment of a system for detecting an avalanche of ionization electrons in the vicinity of a conducting wire of a grid of a detector according to the invention.
Figure 5B:
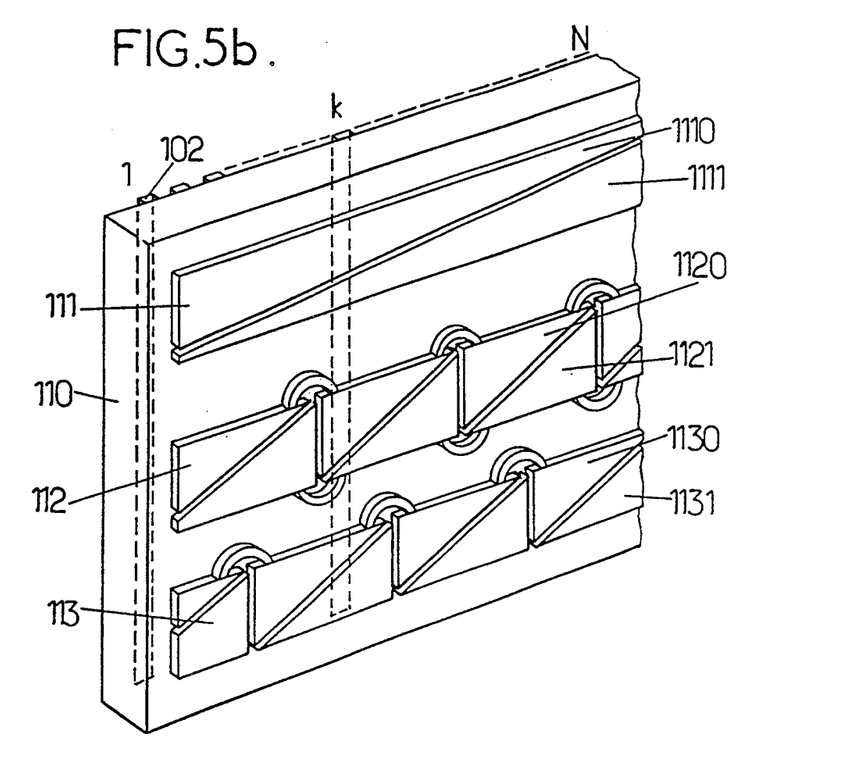

As further shown in FIGS. 5a–b, the ionizing-radiation detector which forms the subject of the present invention, also comprises, at the level of the second grid G2 for example, and at the end of the conducting wires 102, a circuit 110 for detecting the electrically conducting wire situated in the vicinity of the avalanche Av front.

In general, it will be noted that the detection devices of the prior art may be used with the detector which forms the subject of the present invention. However, and in order to retain for the assembly comprising the detector and the detection system, a resolution substantially equal to that of the spacing of the electrically conducting wires, it is advantageous to provide a detection system of the electrostatic type, which will be described in particular with reference to FIGS. 5a and 5b.

The electrostatic detection circuit in general has a capacitive coupling with a given wire of given row k in a one-to-one relation with the row of the electrically conducting wire placed in the vicinity of the avalanche phenomenon.

As shown in FIG. 5a for example, the electrostatic detection circuit 110 may advantageously comprise a first electrically conducting strip 111. This conducting strip 111 is subdivided according to a periodic pattern into two elementary strips, 1110, 1111, whose electrostatic coupling to each wire of row k of the second grid is proportional to the length of the wire of row k placed opposite the elementary strip 1110 or 1111 in question, and therefore a respectively increasing and decreasing function of the row k of the wire in question.

Furthermore, a circuit 114 for measuring the amplitude of the end signal generated respectively at the end of the first and second elementary strips 1110, 1111, is provided. In FIG. 5a, the end signals are denoted A1 and B1 respectively, for the aforementioned first and second elementary strips 1110, 1111. It will further be noted that the measurement circuit 114 makes it possible advantageously to take the ratio R of the end signals A1, B1, this ratio R being representative of the row k of the wire in whose vicinity the avalanche was generated. Advantageously, it will be noted that the two elementary strips 1110, 1111, are formed by two substantially triangular strips obtained from a rectangular strip subdivided along one of its diagonals. Thus, the aforementioned periodic pattern is considered to be a triangular pattern, of spatial period 1, for the two aforementioned elementary strips. Thus, each wire of row k has a coupling respectively with the first and second elementary strips 1110, 1111, which in proportional to the length of wire covered by each elementary strip in question.

The end signals A1 and B1 are thus proportional to this length, and their ratio is one-to-one correspondence with the aforementioned lengths, and finally with the row k of the wire in question.

As will also be noted on regarding FIG. 5a, the electrostatic detection circuit 110 further comprises at least one second electrically conducting strip 112. This second strip is subdivided into a first and second elementary strip, denoted 1120, 1121. It will in fact be noted that, according to a particularly advantageous characteristic, the first and second elementary strips 1120, 1121, are obtained by subdivision of the second strip 112 according to the same periodic pattern as that of the first strip, but with a spatial period which is a multiple of that of the first electrically conducting strip, in a ratio v. FIG. 5a thus shows the first and second elementary strips 1120, 1121, of the second strip 112, formed by a succession of triangular elements, the electrically interconnected upper triangular elements forming the first elementary strip 1120, and the electrically interconnected lower triangular elements forming the second elementary strip 1121. It will be noted that the circuit 114 for measuring the signals A1, B1, also makes it possible to measure the end signals A2, B2 delivered by the first and the second elementary strips 1120, 1121, of the second strip 112. In general, it will be noted that the ratio v may be taken to be a value less than 1, for example a value equal to 1/10 may be adopted. Thus, the first and second electrically conducting strips 111, 112 form a vernier-type measurement system for the row k of the electrically conducting wire situated in the vicinity of the avalanche.

Finally, it will be noted that the electrostatic detection circuit 110 may advantageously comprise a third electrically conducting strip 113, which is identical to the second electrically conducting strip 112, the periodic patterns being simply shifted by one half period, in order to allow lifting of the ambiguity of the determination of the row k of the corresponding wire when this wire is located in the vicinity of a gap separating two triangular patterns belonging respectively to the first and second elementary strip 1120, 1121, of the second electrically conducting strip 112. It will be noted that the end signals delivered by the third electrically conducting strip 112 are denoted A3, B3.

Thus, the circuit 114 for measuring the amplitude of the end signals also makes it possible to measure the aforementioned signals A3, B3, in order to ensure, on the one hand, determination of the row k of the wire in question, according to the aforementioned vernier-type measurement system, and, on the other hand, lifting of ambiguity of the actual row k of the wire in question with respect to the second and third electrically conducting strips, 112, 113.

It will be noted that, in general, as represented in FIG. 5b, the electrostatic detection circuit 110 may be produced by silk-screen printing or according to the two-sided printed circuit technique, on a sheet of plastic of 100 $\mu$m thickness, for example, a first face comprising the electrically conducting strips—first, second and third strip 111, 112, 113—and the opposite face comprising electrical conductors such as printed circuit tracks, which are for example rectilinear, each track of row k of the opposite face obviously being interconnected by microsoldering to the electrically conducting wire 102 constituting the grid G2, as represented in FIG. 5a.

Thus, the capacitive coupling is produced by means of the constituent dielectric material of the support formed by the sheet of plastic.

Figure 5C:
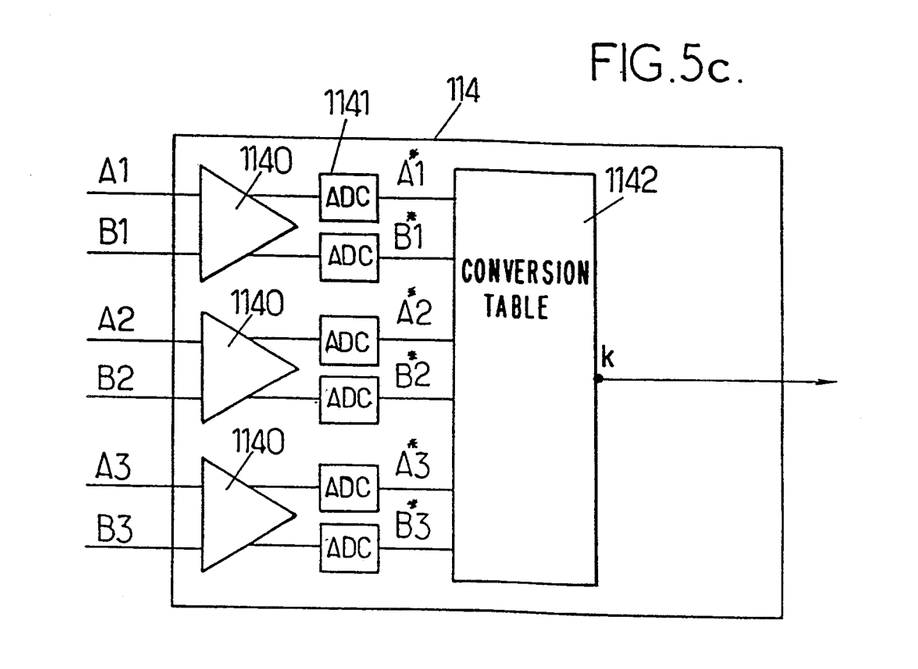
FIG. 5c represents a measurement circuit.

As regards the circuit 114 for measuring the amplitude of the end signals A1, B1; A2, B2; A3, B3, the circuit may advantageously comprise, as represented in FIG. 5c, a series of three amplifiers, denoted 1140, these amplifiers amplifying the previously mentioned end signals delivered by the previously described conducting strips, it being possible for these amplifier circuits to be, for example, produced by operational amplifiers. Furthermore, the amplifiers are followed by fast analog/digital converters, denoted 1141, which make it possible to deliver the corresponding digital signals A1*, B1*; A2*, B2*; A3*, B3*. It will be noted that the previously cited analog/digital converters will preferably be 12-bit analog/digital converters, for example, allowing fast conversion capable of permitting a counting frequency of the order of 1 MHz.

As represented in FIG. 5c, the measurement circuit 114 further comprises, following the previously mentioned analog/digital converter, a conversion table, this conversion table comprising the stored values of the row k of each wire as a function of the values of the aforementioned digitized signals. It will be noted, by way of example, that the values A1*, B1*; A2*, B2*; A3*, B3* may then constitute the addresses of the corresponding stored values k. Thus, on detection by a wire of row k of the grid G2, as represented in FIG. 5a, the value delivered by the analog/digital converters 1141 makes it possible to read the conversion table 1142 in order to deliver the value of k, the row of the wire in question. It will thus be understood that the electrostatic detection system as described with reference to FIGS. 5a, 5b and 5c, thus makes it possible precisely to determine location of the avalanche phenomena by determining the row k of the electrically conducting wire 102 near which the avalanche phenomenon has occurred, this detection being made as a function of the ratio v of the periods of the first and second electrically conducting strips, it being possible for the detection as a function of the value of this ratio, taking into account the number N of wires, to be a detection of the centroid type. It will furthermore be understood that the conversion table 1142 may be arranged so as to deliver not only the most probable value of k, but also the neighboring values, it then being possible for the sum of the values of the signals A1, B1 for example also to be used in order to represent the amplitude of the signal and the distribution of the latter as a function of the row k of the electrically conducting wire 102 in question.

Figure 6A:
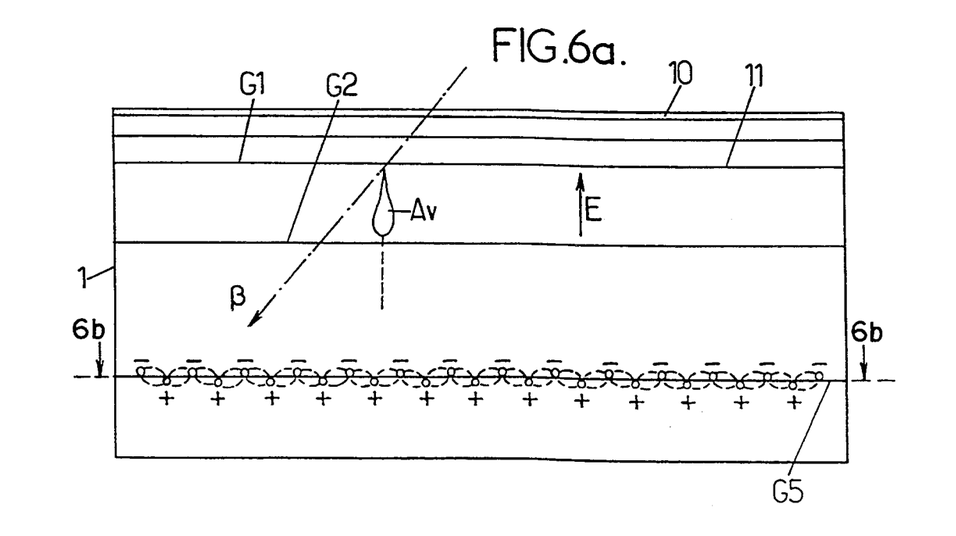
FIG. 6a represents the substructure of a detector which forms the subject of the invention, in which a grid comprising an alternate polarization of the conducting wires is provided, such a detector being more especially well suited for detecting high-intensity ionizing β-radiation for which a high counting speed is necessary.

In another mode of representation of the ionizing-radiation detector which forms the subject of the present invention, as represented in FIG. 6a, this detector further comprises a grid, denoted G5, which is polarized so that the conducting wires 102 are held at alternate electrical potentials. The acceleration space of the ionization electrodes then consists of the space situated between two consecutive conducting wires.

Figure 6B:
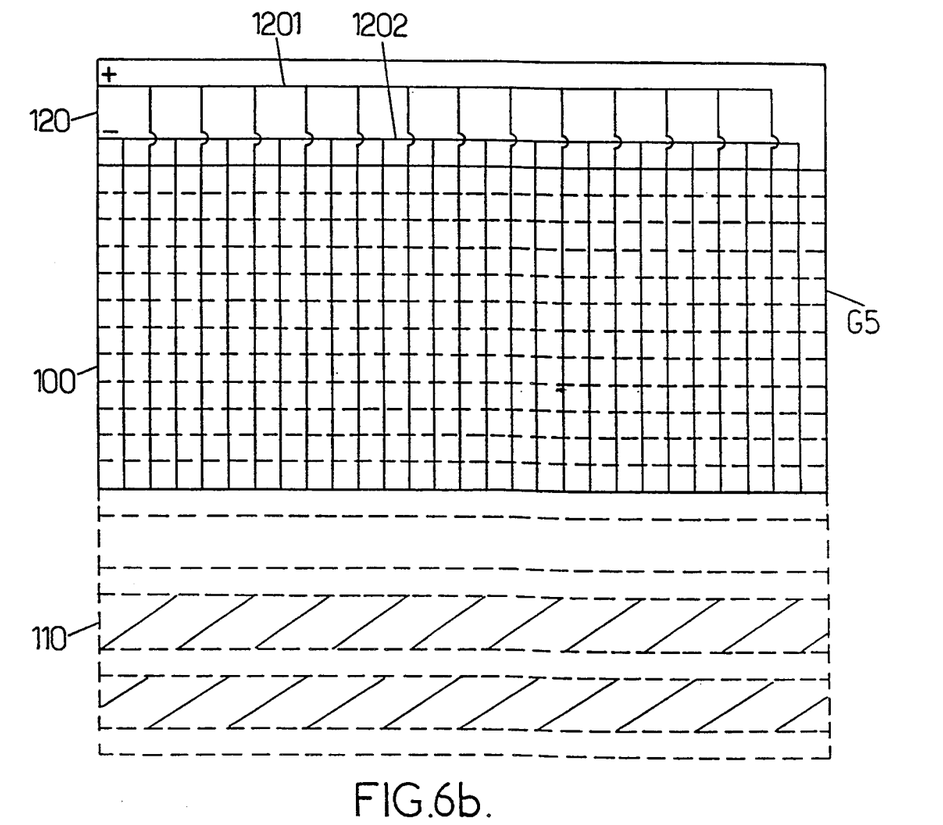

As represented in FIG. 6b, which is a view along a cutting plane 6b-6b in FIG. 6a, the plate G5 may then advantageously comprise a circuit 120 of the printed circuit type, which comprises a first path 1201 connected to a positive potential, and making it possible to supply and polarize the electrically conducting wires 102 of even row, whilst a second path 1202 makes it possible for example to polarize the odd electrically conducting wires 102 of row k negatively. It will be noted that the grid G5 may advantageously be provided with an electrostatic detection circuit 110, as previously described with reference to FIGS. 5a, 5b and 5c.

It will be noted that the positive and negative potentials delivered by the paths 1201 and 1202 are for example potentials with values of a few hundreds of volts. Thus, the amplification takes place alternately every two wires, these being separated only by 100 microns, or the distance separating two electrically conducting wires 102. Such an arrangement has certain advantages, in particular in the case of locally highly intense sources, which makes it possible very quickly to remove the ions generated by the avalanche phenomenon.

It will finally be noted that the gas ionizing-radiation detector which forms the subject of the invention is perfectly suitable to two-dimensional detection of the avalanche phenomena, with spatial resolutions which are the same or different in the two detection directions. Such a detector will be described with reference to FIGS. 7a and 7b.

Figure 7A:
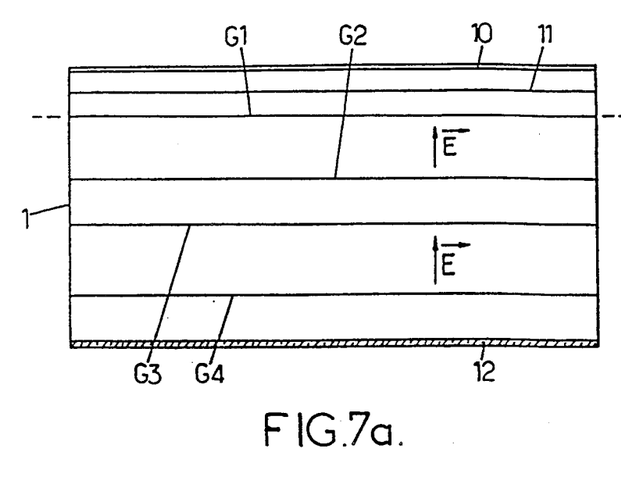
FIGS. 7a and 7b represent a first and second embodiment of the detector according to the invention allowing two-dimensional detection or reading while FIGS. 7a' and 7a'' show respective portions of grids G2 and G3 of FIG. 7a viewed in the direction of propagation and FIGS. 7b' and 7b'' show respective portions of grids G2 and G3 of FIG. 7b viewed in the direction of propagation.

According to the aforementioned FIG. 7a, the detector in accordance with the subject of the present invention, successively comprises a grid G2, then a grid G3, the direction dG3 of the electrically conducting wires of the grid G3 shown in FIG. 7a being orthogonal to the direction dG2 of the corresponding wires of the grid G2 shown in FIG. 7a'. In such an embodiment, it will be noted that the orthogonal grids G2 and G3 are then arranged and polarized so as to form, in the space G2, G3, a drift space, it being possible to take the distance separating the grids G2 and G3 to be equal to 1 mm, for example. The avalanche electrons are then transferred into the drift space by positive polarization of G3 with respect to G2, which makes it possible, by virtue of the presence of the grid G3, orthogonal to the grid G2, to effect the two-dimensional detection or reading of the avalanche phenomenon.

Figure 7B:
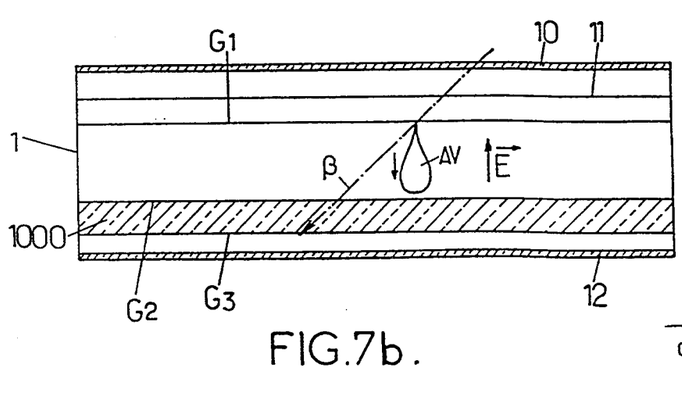

According to a variant represented in FIG. 7b, the grid G3, orthogonal to the grid G2, the direction of the electrically conducting wires dG2, dG3 of the two grids being orthogonal (as shown in FIG. 7b' and 7b'', respectively), but the grids being arranged parallel, is separated from this grid G2 by a dielectric material 1000. In such a case, the signals induced on the grid G3 are so induced by the electrical influence of the electrons which are captured in the grid G2, and therefore of opposite sign to those obtained at the level of grid G2. The dielectric material used may consist of a sheet of MYLAR ®(polyethyleneterephthalate).

Finally, it will be noted that the two-directional detection may be produced by using orthogonal grids according to the embodiment in FIG. 1a, the grids G1 and G2 being orthogonal.

In all cases, a detection system as described and represented in FIG. 5a, associated with each grid G2, G3, makes it possible to ensure two-directional detection of the ionizating radiation.

A particularly high-performance gas ionizing-radiation detector has thus been described, inasmuch as this detector, by virtue of very great simplification of the production of the grids intended to define the avalanche space, furthermore makes it possible to obtain a spatial resolution of the order of 100 microns, which allows an improvement of the resolving power in a ratio better than 10 compared to the detectors of the prior art. Furthermore, the use of resistive conducting wires makes it possible to obtain particularly robust gas detectors, since these then allow the risks of damage to the grids by the phenomenon of electrical discharge to be eliminated, by limiting the corresponding discharge current.

I claim:

1. Gas ionizing-radiation detector, comprising in a sealed enclosure a gas generating ionization electrons by the avalanche phenomenon, and at least two grids held at different electrical potentials and making it possible to accelerate the ionization electrons, wherein at least one of said grids is formed in a first direction by a plurality of electrically insulating wires acting as a support, and in a second direction, distinct from the first, by a plurality of electrically conducting wires, said wires directed along the first and second directions respectively forming a woven mesh.

2. Detector according to claim 1 wherein said second grid forms an anode for said ionization electrons with respect to the first grid.

3. Detector according to claim 2 wherein said second grid is formed as a mesh of the electrically conducting wires and of the electrically insulating wires, which said wires are formed parallel and rectilinear.

4. Detector according to claim 3 wherein said second grid comprises, at the end of the conducting wires, means for detecting the electrically conducting wire situated in the vicinity of the avalanche front.

5. Detector according to claim 4 wherein said detection means are electrostatic means having capacitive coupling with a given wire of given row order in one-to-one relationship with the row order of said electrically conducting wire.

6. Detector according to claim 5 wherein said electrostatic detection means comprise at least:
   a first electrically conducting strip, said conducting strip being subdivided according to a periodic pattern into two elementary strips whose electrostatic coupling to each wire of row order of the second grid is respectively an increasing and decreasing function of the row order of the wire in question,
   means for measuring the amplitude of the end signal generated respectively at the end of the first and second elementary strips, and of the ratio of said end signals, said ratio being representative of the row order of the wire in the vicinity of which the avalanche front was generated.

7. Detector according to claim 6 wherein said electrostatic detection means further comprises at least:
  a second electrically conducting strip, said second strip being subdivided into a first and a second elementary strip, according to the same periodic pattern, with a period which is a multiple of the first electrically conducting strip, with a ratio v,
  means for measuring the amplitude of the signals generated by the capacitive coupling respectively at the end of the first and second elementary strips, and of the ratio of the amplitude of said end signals, said first and second electrically conducting strips forming a vernier-type system for measuring the row order of the electrically conducting wire situated in the vicinity of the avalanche.

8. Gas detector according to claim 1 wherein said electrically conducting wires are formed by a plastic wire whose lateral surface is provided with an electrically conducting layer ($\epsilon$) having an electrical resistance per unit length $\rho$ lying between $200 k\Omega/cm < 600 k\Omega/cm$, which makes it possible to limit the current generated by electrical discharge in the space containing said grids.

9. Detector according to claim 8 wherein the electrically conducting layer is formed by a thin film of carbon.

10. Detector according to claim 9 wherein the wires constituting said at least one grid are parallel and separated by a distance of between 50 and 500 microns.

11. Detector according to claim 1 said detector comprising, outside the space lying between said grids, at least one backing grid making it possible to apply to said grids an electrostatic force for compensating for the electrostatic force generated between said grids, which makes it possible to eliminate the deformations of said grids, keeping their spacing constant.

12. Detector according to claim 1 wherein at least one said grids is polarized so that the conducting wires are held at alternate electrical potentials, the space for accelerating the ionization electrons consisting of the space situated between two consecutive conducting wires.

13. Detector according to claim 1 wherein this detector successively comprises two grids whose electrically conducting wires are directed in orthogonal directions, which makes it possible to produce two-dimensional detection or reading.

* * * * *